INVENTORS.
John J. Zimsky
William B. Stewart

June 27, 1961 J. J. ZIMSKY ET AL 2,989,883
METHOD AND APPARATUS FOR VARYING THE LENGTH OF MATERIAL
CUT IN RESPONSE TO VARIATIONS IN THE
THICKNESS OF THE MATERIAL Filed Nov. 26, 1958 2 Sheets-Sheet 2

INVENTORS.
John J. Zimsky
William B. Stewart
BY
Lee H. Kaiser
Attorney

United States Patent Office 2,989,883
Patented June 27, 1961

1

2,989,883
METHOD AND APPARATUS FOR VARYING THE LENGTH OF MATERIAL CUT IN RESPONSE TO VARIATIONS IN THE THICKNESS OF THE MATERIAL
John J. Zimsky, Bridgeville, and William B. Stewart, Washington, Pa., assignors to McGraw-Edison Company, Milwaukee, Wis., a corporation of Delaware
Filed Nov. 26, 1958, Ser. No. 776,496
14 Claims. (Cl. 83—34)

This invention relates to a method and apparatus for fabricating laminations for magnetic cores.

The present invention is an improvement over the device covered by application Serial No. 613,122 in the name of Andrew F. Depken, filed October 1, 1956, now U.S. Patent No. 2,890,750 and having the same assignee as the subject invention, which discloses a machine for shearing a continuous magnetic strip into laminations of progressively different length and having novel means for actuating a shear when the magnetic strip is against a stop to sever the strip into individual laminations and to index the stop and shear relative to each other after each operation of the shear. A magnetic core may be constructed by stacking such laminations in order of their progressively different lengths with the ends of each lamination in uniformly overlapping relation, forming the laminations so stacked into desired shape, and annealing the laminations so shaped.

When the respective ends of each of the laminations of large kva. size magnetic cores are uniformly overlapped, the laminations, instead of being compactly stacked as desired, are often loosely nested with spaces between the the laminations, instead of being compactly stacked as delaminations which permit relative movement between laminations and result in irregularly shaped cores. We have discovered that these undesirable features result from variations in thickness of the magnetic strip from the nominal value. The shear and stop are moved a distance relative to each other after each shearing operation to provide an increase in peripheral length of the radially successive laminations. This increase in length is referred to as the "increment of progression" and is a function of nominal lamination thickness. When the variation in thickness of the magnetic strip results in a greater or lesser number of laminations per inch of thickness than the theoretical value, the peripheral length to which each lamination is sheared differs from the circumferential length of the layer it occupies in the final core. Consequently, when the laminations are stacked with the ends of each overlapped the same amount, the erroneous peripheral lengths cause buckling of the laminations and air spaces therebetween which result in irregularly shaped cores having loosely stacked laminations.

It is an object of the invention to provide an improved method of constructing magnetic cores, including the step of shearing magnetic strip into laminations of progressively different lengths, which results in cores of uniform shape having compactly nested laminations with no air spaces therebetween.

It is a further object of the invention to provide improved apparatus for shearing magnetic strip into laminations of progressively different lengths which compensates for variations in the thickness of the magnetic strip. It is a still further object of the invention to provide such apparatus which controls the increment of progression in accordance with the thickness of the magnetic strip.

These and other objects and advantages of the invention will be better understood by reference to the following description when taken in conjunction with the accompanying drawing, wherein.

Figure 1:
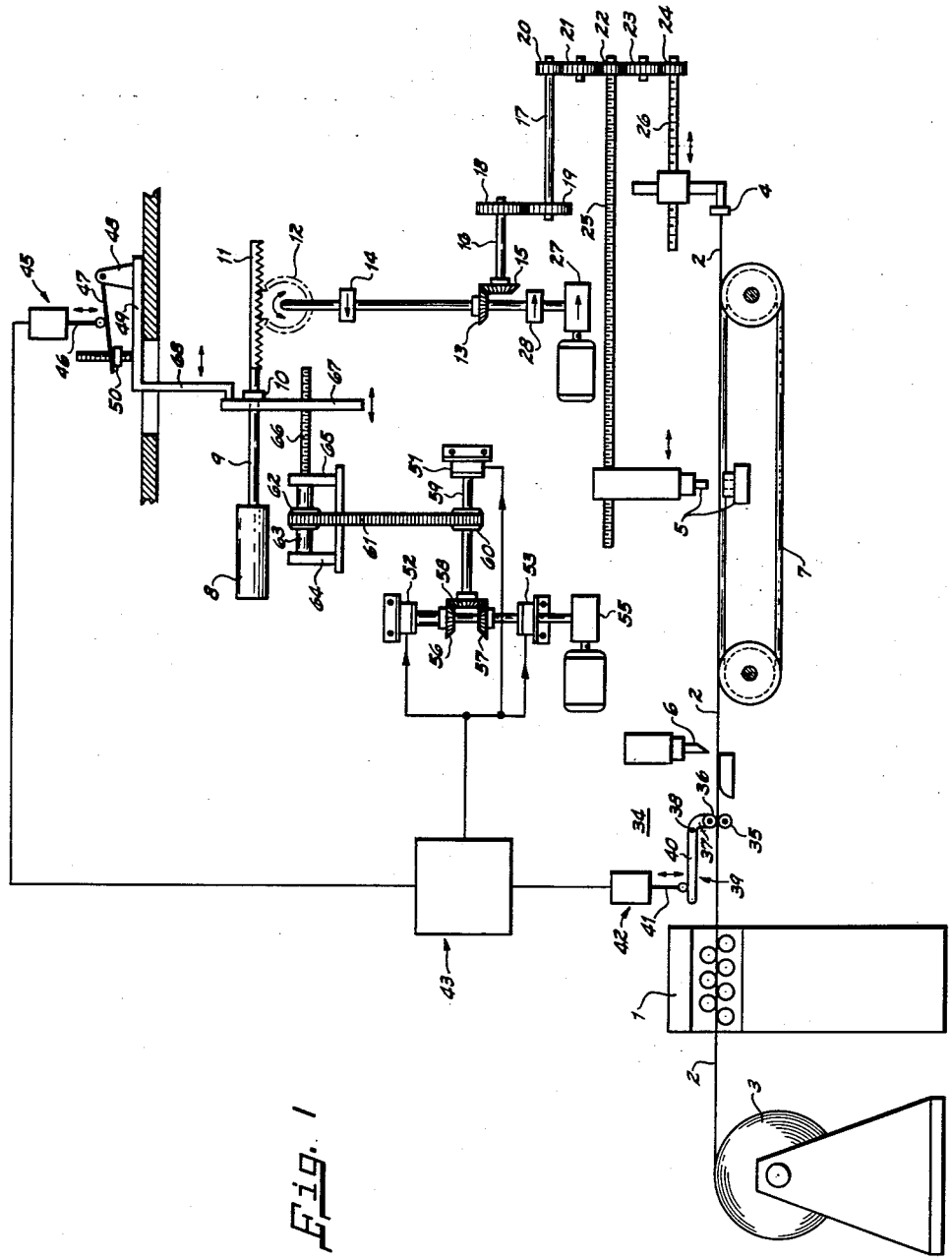
FIG. 1 is a schematic representation of a shearing device embodying the apparatus and illustrating the method of the invention.

The apparatus of the invention is similar to and an improvement over that disclosed in the aforementioned application Serial No. 613,122. Referring to the drawing, a feed mechanism 1 unwinds magnetic steel strip 2 from a storage roll 3 and moves it longitudinally at substantially constant speed through a shearing machine having a stop 4 normally in the path of the strip 2. Disposed adjacent the path of the strip 2 are a punch 5 and shear 6 spaced from each other longitudinally of the strip 2. Punch 5 is located preferably one-half of the distance between the stop 4 and shear 6. Means including a pair of belts mounted on pulleys, designated generally as 7, are provided for supporting and for conveying the magnetic steel strip 2 through the shearing machine. The stop 4, shear 6, and punch 5 are each operated by its own actuating means (not shown).

The aforementioned application Serial No. 613,122 discloses novel means incorporated in the present invention, but not shown, for detecting the presence of the magnetic strip and for initiating signals to operate the punch 5 and shear 6 after a time delay of sufficient length to assure that the end of strip 2 is against the stop 4. After the punching and shearing operations, the punch 5 and stop 4 are moved relative to the shear 6 distances proportional to the increment of progression by which the peripheral length of each radially successive lamination cut from the steel strip 2 is longer than the preceding lamination. Means for moving stop 4 and punch 5 relative to shear 6 in a direction longitudinal of the strip 2 after each operation of shear 6 includes an air cylinder 8 energized, by means not shown, in response to operation of shear 6 and adapted to actuate a piston affixed to a reciprocable elongated drive rod 9 having rack 11 integral therewith and a flange 10 intermediate its ends. Rack 11 actuates a pinion 12 to rotate an overrunning clutch 14 when the air cylinder 8 is actuated and drives a bevel gear 13 through the clutch 14 upon the return stroke of rack 11 and the air cylinder piston to the left as illustrated in FIG. 1. Bever gear 13 is engaged with a bevel gear 15 fixedly carried by a shaft 16, and rotation of shaft 16 is transmitted to a shaft 17 through a pair of gears 18 and 19 which are fixedly attached to shafts 16 and 17 respectively. Rotation of shaft 17 is transmitted by a drive gear 20 fixedly attached thereon to a gear train including an idler gear 21 and a gear 22 which is rigidly affixed to a lead screw 25. The gear train also includes a transfer gear 23 which meshes with both gear 22 and a gear 24 which is rigidly secured to a lead screw 26. Punch 5 operatively engages lead screw 25, and stop 4 operatively engages lead screw 26. Consequently, rotation of gears 22 and 24 is translated into linear motion of the punch 5 and stop 4 respectively, thereby displacing the punch 5 and the stop 4 horizontally relative to the shear 6 in a direction parallel to the path of magnetic strip 2.

A reversing mechanism including a motor-driven gear reducer 27 operatively connected to the bevel gear 13 by an overrunning clutch 28 is also provided to return the stop 4 and punch 5 to their initial positions upon completion of the shearing of the laminations of a magnetic core.

The locating hole formed by punch 5 should preferably be positioned substantially in the center of the fabricated laminations to insure proper alignment of the laminations in the final core. Hence, it is desirable that the punch 5 be moved only one-half of the distance that the stop 4 travels after each operation of shear 6. This may be accomplished either by having the speed of rotation of gears 22 and 24 equal and providing lead screw 26 with a pitch that is twice that of lead screw 25, or by selecting suitable gears which will result in the speed of rotation of drive gear 24 being twice that of drive gear 22 and providing lead screws 25 and 26 of equal pitch. The former of these alternatives is preferably employed in the embodiment of the shearing and punching machine of the invention herein described.

Figure 5:
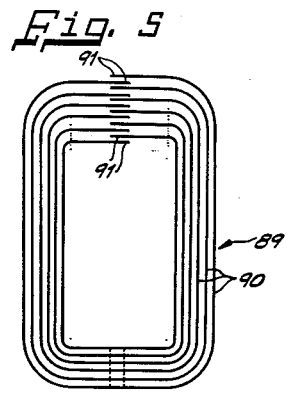
FIG. 5 is a schematic representation of a magnetic core constructed in accordance with the method of the invention.

Up to this point the shearing apparatus as described is similar to that disclosed in application Serial No. 613,122 referred to above. As was stated hereinbefore, magnetic cores constructed from laminations fabricated in such apparatus often had loosely nested laminations with undesirable spaces therebetween. FIG. 5 illustrates a magnetic core 89 constructed in accordance with the method of the invention having a plurality of concentrically nested laminations 90 of progressively different lengths with the respective ends 91 of each lamination overlapped the same amount. We have discovered that variations in the thickness of the magnetic strip results in a lamination 90 being sheared to a peripheral length different than the circumferential length of the layer occupied by the lamination in the final core. Consequently, when the laminations 90 are stacked with ends of each overlapping the same amount, buckling of the laminations occurs and undesirable air spaces result between the laminations. The improved method of the invention obviates these undesirable results by the steps of measuring the thickness of the magnetic strip and controlling the length to which radially successive laminations are severed in accordance with said thickness in order to compensate for such variations in thickness of the magnetic strip. In a specific manner of practicing the method, the shear and stop are moved relative to each other after each operation of the shear a distance which is a function of the thickness of said magnetic strip. Further, the preferred mode of practicing the invention illustrated in the drawing includes the steps of generating an electrical signal whose magnitude is a function of the deviation in thickness of said magnetic strip from a predetermined value and whose phase is a function of the direction of said deviation, varying the increment in progression in accordance with the magnitude of said signal, and controlling the direction of said variation in accordance with the phase of said signal.

Located at the entrance end of the shearing apparatus of the invention is a thickness measuring sensing means designated generally as 34 and including a pair of ball bearings 35 and 36. The position of bearing 35 is in fixed relation to the path of the strip 2, and bearing 36 is movable in a direction perpendicular to the path in response to variation in thickness in strip steel 2. Bearing 36 is mounted on the shorter leg 37 of a pivoted motion-multiplying bell crank 39. Resting on the longer leg 40 of the bell crank 39 is a rod 41 affixed to the movable core 72S (see FIG. 2) of a linear variable differential sensing transformer 42.

Figure 4:
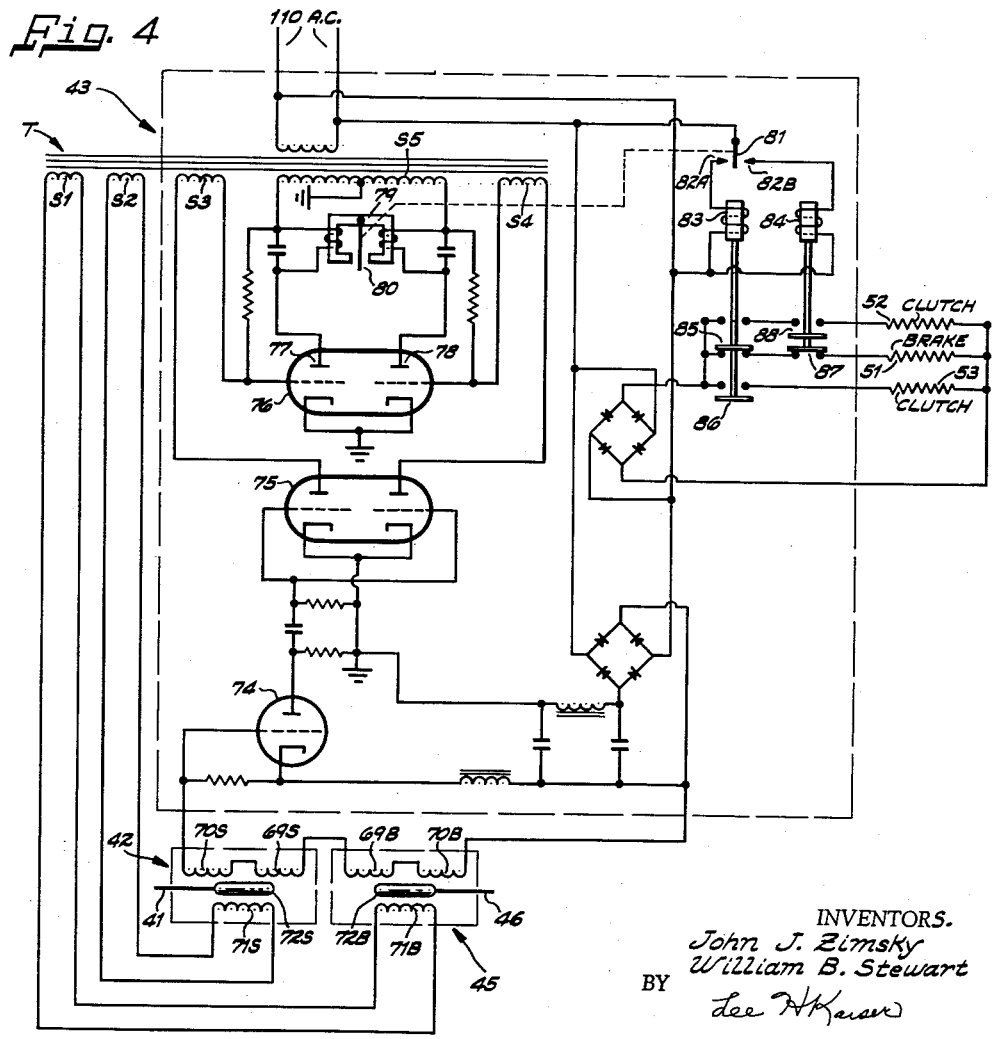
FIG. 4 is a schematic electrical circuit diagram of the sensing and control means of the device of FIG. 1.

As illustrated in FIG. 4 and described hereinafter, the output of the thickness measuring sensing transformer 42 is electrically connected to an unbalance detector 43 which compares the output signal from transformer 42 with a reference signal to detect variations in the thickness of the magnetic strip 2. In the preferred embodiment, the reference signal is generated by a linear variable differential transformer 45 identical to sensing transformer 42 and having the output thereof connected in opposition to that of sensing transformer 42 so that no signal is delivered to the unbalance detector 43 when the magnetic steel strip 2 is of nominal thickness.

Extending downwardly from the balancing transformer 45 and resting on an inclined plate 47 is a rod 46 affixed to the movable core 72B of balancing transformer 45. The inclined plate 47 is hinged at one end on a bracket 48 supported on a horizontally reciprocable plate 49. The opposite end of inclined plate 47 is carried by an adjusting means 50 for varying the angle of inclination of plate 47 relative to plate 49.

Means for varying the increment of progression in accordance with the thickness of magnetic strip 2 includes an electric brake 51 and two electric clutches 52 and 53 electrically connected to and operated in response to output signals from the unbalance detector 43. A motor driven gear reducer 55 is adapted to be selectively connected through the clutches 52 and 53 to bevel gears 56 and 57 respectively. A bevel gear 58 meshing with both bevel gears 56 and 57 is operatively connected to the brake 51 by a shaft 59.

Fixedly attached to shaft 59 is a sprocket 60 which drives a chain 61 operatively connected with a driven sprocket 62. The driven sprocket 62 is fixedly carried on a rotatable shaft 63 which, in turn, is journalled within supports 64 and 65. Extending axially from shaft 63 is an acme screw 66 which operatively engages and is adapted to move a stop member 67. The reciprocable rod 9 of the air cylinder 8 extends through a clearance aperture in the stop member 67, and the flange 10, which is integral with the rod 9, engages stop 67 on the side away from the air cylinder 8. A connecting arm 68 operatively engages both stop member 67 and slidable plate 49. It will thus be apparent that rotation of shaft 59 will result in simultaneous displacement of stop member 67, reciprocable plate 49, and inclined plate 47 carried by plate 49 to vary the position of movable core 72B within balancing differential transformer 45.

Figure 2:
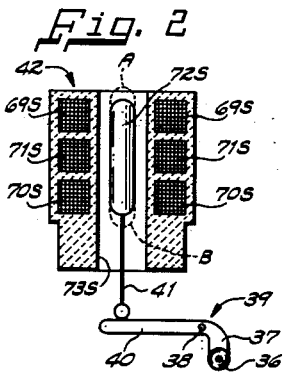
FIG. 2 is a partial section view through the thickness measuring means of the device of FIG. 1.

Reference is now made to FIG. 2 wherein the linear variable differential sensing transformer 42 of the thickness measuring unit means is illustrated in greater detail. The differential transformers 42 and 45 are identical and matched, and the same reference numerals are given to similar parts thereof with the addition of "S" to the parts of the sensing transformer 42 and "B" to the elements of the balancing transformer 45. An annular primary winding 71S is disposed between and coaxial with two annular secondary windings 69S and 70S. The movable core 72S is carried in the axial opening 73S of the transformer 42. As explained hereinbefore, the rod 41 extends downwardly from the core 72S to the bell crank 39. The dotted lines denote two possible positions A and B which the core 72S may assume with respect to the transformer windings 69S, 70S, and 71S. Position A will be assumed if the steel strip 2 is running below nominal thickness and position B if the strip is running above.

Figure 3:
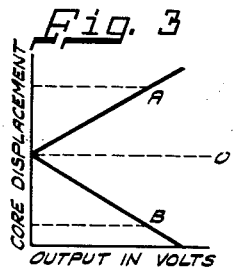
FIG. 3 is a graphical representation of the output voltage of the device of FIG. 2.

FIG. 3 is a graphical representation of the output of the two secondary windings 69S and 70S connected in series opposition. Point 0 is the balance point and corresponds to the condition when the core 72S is centered within the transformer 42 with respect to the secondary coils 69S and 70S. In this position the voltages induced in the secondary coils 69S and 70S from the primary winding 71S are equal in magnitude and opposite in phase, and thus cancel each other. Points A and B of the graph correspond to the voltages induced in coils 69S and 70S when the core 72S is displaced to the respective positions A and B of FIG. 2. The output voltage of the sensing transformer 42 is substantially linearly proportional to the displacement of the core 72S from the balance point. The output voltage when the core 72S is displaced away from the balance position toward the A position is 180° out of phase with respect to the phase of the output voltage when the core 72S is displaced away from the balance point toward the B position.

Now referring to FIG. 4, the circuitry of the unbalance detector 43 is enclosed within the broken lines. The thickness measuring sensing transformer 42, the balancing transformer 45, and the operating windings of the electric brake 51 and the clutches 52 and 53 are shown as being external of the unbalance detector 43.

As shown in FIGS. 2 and 3, when the core 72 of each transformer 42 and 45 is centered with respect to its secondary winding 69 and 70, the combined output voltage signal is zero. The unbalance detector 43 operates on the null balance principle and algebraically compares the outputs of the differential transformers 42 and 45. The primary windings 71S and 71B of the sensing transformer 42 and the balancing transformer 45, respectively, are energized from equal secondary windings S1 and S2 of a suitable sixty-cycle power supply transformer T. The secondary windings 69S, 70S, 69B and 70B of the sensing and balancing transformers 42 and 45, respectively, are connected in series opposition and to the input of unbalance detector 43, so that when the voltage outputs of both differential transformers 42 and 45 are of equal amplitude and opposite in phase, the output signals will cancel and there will be no input signal to the unbalance detector. Sensing transformer 42 is positioned so that the core 72S is centered with respect to the secondary coils 69S and 70S when the magnetic strip 2 traveling between bearings 35 and 36 is of nominal thickness. The voltage output of the transformer 42 is thus proportional to the variation in thickness of magnetic strip 2 and the consequent displacement of the transformer core 72S, and the phase of the voltage output is determined by the direction of this variation from the nominal thickness. When the core 72S of the sensing transformer 42 is displaced from the balance position, an unbalance will exist between the output signals of the transformers 42 and 45 and an unbalance voltage will be fed into the unbalance detector 43. The unbalance detector 43 amplifies this input signal and utilizes the amplified signal to vary the increment of progression, i.e. the movement of the stop 4 and punch 5 relative to the shear 6, in a manner described hereinafter and also to move the core 72B of the follow-up, or balancing, transformer 45 until the combined output of the two differential transformers 42 and 45 is zero.

As described above, the direction of displacement of the core 72S of the sensing transformer 42 determines the phase of its output voltage and such direction of displacement is dependent on whether the steel strip 2 is above or below nominal thickness. Therefore, by determining the phase of the output voltage of the sensing transformer 42 relative to a reference signal, the unbalance detector 43 may determine whether the steel strip 2 is above or below nominal thickness, and hence whether the increment of progression should be increased or decreased to compensate for such variation in thickness. The unbalance detector 43 compares the phase of the combined output voltage from the differential transformers 42 and 45 to that of the alternating current excitation voltage to determine the relative phase of this output voltage and then derives a signal to increase or decrease the increment of progression accordingly. The combined output voltage of the sensing transformer 42 and the balancing transformer 45 is amplified in a triode 74 and is then impressed simultaneously on the grids of both halves of a double triode 75 having the cathodes thereof grounded and the anodes energized from similar secondary windings S3 and S4 of power supply transformer T. The output signals at the anodes of the halves of double triode 75 are coupled to the grids of both halves of a double triode 76 having their cathodes grounded. The anodes 77 and 78 of the halves of double triode 76 are connected to opposite ends of a grounded-midpoint secondary winding S5 of power supply transformer T, and hence the anodes 77 and 78 are opposite in phase. Only that half of double triode 76 which has signals of similar polarity impressed on both grid and anode will conduct, and a relay 79 having windings in the anode circuits of both halves of the double triode 76 will operate to actuate its armature 80 in a direction determined by which half of double triode 76 is conducting. The armature 80 selectively actuates a movable contact 81 into engagement with stationary contact 82A or 82B to complete an energizing circuit to either of two relays 83 or 84. Operation of relay 83 opens contacts 85 to de-energize the operating winding of electric brake 51 and closes contacts 86 to energize the operating winding of clutch 53. Operation of relay 84 opens contacts 87 to de-energize the brake 51 and closes contacts 88 to energize the clutch 52.

In operation, the magnetic steel strip 2 is fed continuously at constant speed through the shearing machine between the ball bearings 35 and 36. Any variation in strip thickness will cause the bearing 36 to move and pivot the bell crank 39 about the poin 38. The movement of the bearing 36 is multiplied by bell crank 39 and transmitted to the core 72S of sensing differential transformer 42 by rod 41.

The position of core 72S is thus changed within the transformer 42 and results in a greater voltage being induced in one of the series opposed secondary windings 69S and 70S than in the other, thereby creating an unbalance between the output voltages of the differential transformers 42 and 45. This combined output voltage is amplified and the phase thereof compared with the sixty-cycle excitation voltage in the unbalance detector 43 in the manner described above. The phase of this combined output signal determines whether relay 83 or relay 84 is actuated, and either clutch 52 or 53 will be energized depending upon which relay 83 or 84 is actuated. Consequently, clutches 52 and 53 are selectively operated in accordance with whether the thickness of steel strip 2 is greater or less than the nominal value. The energized clutch 52 or 53 then causes the motor driven gear reducer 55 to drive bevel gear 56 or 57 to rotate the bevel gear 58, shaft 59, sprocket 60, chain 61, sprocket 62, and shaft 63. The acme thread 66 rotates with the shaft 63 and displaces the stop member 67 horizontally to vary the increment of progression, i.e. the distance the stop 4 and punch 5 are moved relative to shear 6. Stop member 67 in moving engages and moves the flange 10 and drive rod 9 with it. Clutch 14 overruns when rack 11 is actuated to the right as illustrated in FIG. 1, and it operatively connects pinion 12 and gear 13 to rotate gear 13 on the return stroke of rack 11 to the left as viewed in FIG. 1. Consequently, the angular rotation of pinion 12 upon operation of air cylinder 8 will be greater, and thus the stop 4 and punch 5 will be moved a greater distance relative to shear 6, when the stop member 67 is moved to the left toward the air cylinder 8, and similarly the increment of progression will be decreased when the stop member 67 is moved to the right away from air cylinder 8.

The distance stop member 67 is moved is determined by the variation in thickness of steel strip 2 and the consequent displacement of core 72S in the sensing differential transformer 42. The displacement of the core 72S results in variation in the output signal from transformer 42 and consequently in a combined output signal from the differential transformers 42 and 45 which accomplishes de-energization of brake 51, rotation of shaft 63, and consequent movement of stop member 67. Motion of the stop member 67 will continue as long as an unbalance exists between the sensing transformer 42 and balance transformer 45, and the mechanical feedback means including inclined plate 47 moves core 72B of balancing transformer 45 to bring the null system into balance and thus arrest motion of stop member 67. The mechanical feedback means for moving core 72B in proportion to the displacement of stop member 67 includes arm 68 actuated by stop member 67 and slidable plate 49 engaged by arm 68 and carrying inclined plate 47.

The angle of inclination of plate 47 is so selected that the core 72B of balancing transformer 45 will not be placed in the balancing position where the combined output of oppositely connected differential transformers 42 and 45 is zero until stop member 67 has traveled the requisite amount to correct the increment of progression to the power value for the variation of thickness of strip 45. When the core 72B of balancing transformer 45 has reached a position with relation to its secondary windings 69B and 70B, which is identical to that of the core 72S with respect to its secondary coils, the output voltage of balancing transformer 45 will cancel that of sensing transformer 42, there will then be no input signal to the unbalance detector 43, and relay 83 or 84 will release to energize the brake 51 and to de-energize clutch 52 or 53. The air cylinder 8 is actuated upon each energization of shear 6 to step the stop 4 and punch 5 by the proper increment of progression to the next shearing position.

Although only a single embodiment of the apparatus and a single manner of practicing the method of the invention has been illustrated and described, many modifications and variations thereof will be apparent to those skilled in the art, and consequently it is intended in the appended claims to cover all such modifications and variations as fall within the true spirit and scope of the invention.

What we claim is:

1. In a device for cutting a plurality of laminations of progressively differing lengths from a continuous strip of magnetic material moving longitudinally through said device in a predetermined path, shear means disposed adjacent said path and movable transversely of said strip for cutting the strip, a stop disposed in said path and spaced from said shear means, whereby a lamination may be cut from said strip by operation of said shear means when the end of said strip abuts against said stop, means for producing relative movement between said stop and said shear means in a direction parallel to said path after each operation of said shear means, whereby successive laminations are cut in progressively differing lengths, and means for determining the thickness of said continuous strip and for controlling the distance said shear means and stop are moved relative to each other in accordance with said thickness.

2. In a machine for cutting a plurality of laminations of progressively differing lengths from a continuous strip of magnetic material moving longitudinally through said machine in a predetermined path, shear means disposed adjacent said path and movable transversely of said strip for cutting the strip, a stop disposed in said path and spaced from the said means, punch means intermediate said shear means and stop and disposed adjacent said path, said punch being movable transversely of said strip for punching a hole therein, whereby a lamination may be cut from said strip upon operation of said shear means and a hole may be punched in said lamination by operation of said punch means when the end of said strip abuts against said stop, means for moving said shear means, punch means, and stop relative to each other in a direction parallel to said path after each operation of said shear means and punch means, and means for determining the thickness of said continuous strip and operative to control said means for moving said shear means, punch means, and stop.

3. In combination with a shearing device for fabricating laminations of progressively different lengths from a continuous strip of magnetic material moving longitudinally through said device including a stop in the path of said strip, shear means spaced from said stop for cutting the strip when the end thereof abuts against said stop, and drive means for relatively moving said stop and shear means parallel to the direction of movement of said strip after each operation of said shear means; means for deriving a first electrical signal proportional to the thickness of said continuous strip, mean for deriving a reference signal having a magnitude equal to that of said first electrical signal for a predetermined thickness of said continuous strip, and means for comparing said first signal and said reference signal, said drive means being controlled by the output from said signal comparison means.

4. In combination with a shearing device for fabricating laminations of progressively different lengths from a continuous strip of magnetic material moving longitudinally through said device including a stop in the path of said strip, shear means spaced from said stop for cutting the strip when the end thereof abuts against said stop, and drive means for relatively moving said stop and shear means parallel to the direction of movement of said strip after each operation of said shear means, means for deriving an electrical signal proportional to the thickness of said continuous strip, and means responsive to the magnitude of said electrical signal and operatively associated with said drive means for varying the distance said shear means and stop are moved relative to each other by said drive means.

5. In a device for fabricating laminations from a continuous strip of magnetic material moving longitudinally through said device, shear means for cutting laminations from said strip, stepping means for changing the length of laminations cut from said strip by said shear means, said stepping means being operable after actuation of said shear means to change said lamination length by a predetermined magnitude, means for determining variations in the thickness of said magnetic strip from a given value, and means responsive to the output of said last-named means for varying said predetermined magnitude.

6. In combination with a shearing machine for fabricating laminations of progressively different lengths from a continuous strip of magnetic material moving longitudinally through said device including a stop in the path of movement of said strip, shear means spaced longitudinally of said strip from said stop for cutting said strip when the end thereof abuts against said stop, drive means for moving said stop and shear relative to each other parallel to said strip after each operation of said shear means, means for deriving a first electrical signal proportional to the thickness of said strip, variable means for generating a reference electrical signal, the amplitude of said reference signal being equal to that of said first electrical signal for a predetermined thickness of said magnetic strip, means for comparing said first electrical signal and said reference signal, means responsive to the output of said signal comparison means for varying the distance said stop and said shear are moved relative to each other by said drive means, and feedback means operated by said last-named means for controlling the amplitude of the reference signal generated by said variable means.

7. In combination with a device for fabricating laminations from a continuous strip of magnetic material moving longitudinally through said device, shear means for cutting said magnetic strip to form laminations, means for progressively changing by a fixed magnitude the length of successive laminations cut from said magnetic strip by said shear means, means for deriving an electrical signal whose magnitude is proportional to the variations in thickness of said strip from a predetermined value and whose phase is determined by the direction of said variation from said predetermined value, means responsive to the amplitude of said signal for varying the magnitude of change of length of successive laminations, and means responsive to the phase of said signal for determining the direction of said variations of change of length of successive laminations.

8. In combination with a shearing device having a shear for cutting a continuous strip of magnetic material moving longitudinally through said device to form laminations; means including a first variable differential transformer for generating a first electrical signal proportional to the thickness of said magnetic strip, adjustable means including a second variable differential transformer for generating a reference electrical signal, the magnitude of said reference electrical signal being equal to that of said first electrical signal for a predetermined thickness of said magnetic strip and the outputs of said first and second differential transformers being connected in opposition, an unbalance detector energized from the combined output of said first signal and said reference signal generating means, said shearing device having means controlled by the output of said unbalance detector for varying the lengths of successive laminations cut from said strip by said shear, and feedback means responsive to said last-named means for varying the amplitude of said reference signal.

9. In combination with a shearing device having a shear for cutting a continuous strip of magnetic material moving longitudinally through said device to form laminations, means including a first variable differential transformer having a core movable in response to the variations in thickness of said strip for generating a first electrical signal proportional to the thickness of said magnetic strip, adjustable means including a second variable differential transformer having a movable core for generating a reference electrical signal, the outputs of said first and second differential transformers being connected in opposition, said shearing device including control means responsive to the combined output of said first signal and said reference signal generating means for varying the lengths of successive laminations cut from said strip by said shear, the output of said control means and the change of length of successive laminations being of predetermined magnitude when said strip is of nominal thickness, and feedback means for moving said core of said reference signal generating means in accordance with variations in the output of said control means from said predetermined magnitude to vary the amplitude of said reference signal.

10. In a shearing device in accordance with claim 9 wherein said feedback means includes a member inclined at an angle to the horizontal actuated in a horizontal plane in accordance with variations in the output of said control means from said predetermined magnitude and supporting said movable core of said reference signal generating means.

11. In the method of constructing a magnetic core of concentric whole turn laminations of progressively different lengths having overlapped ends including the steps of positioning the end of a continuous strip of magnetic material against a stop, operating a shear while said strip is so positioned against said stop to form an individual lamination, and subsequent to the shearing step relatively moving said shear and said stop a distance proportional to change in peripheral length of radially adjacent laminations in said magnetic core, the improvement comprising the steps of measuring the thickness of said continuous strip and controlling the distance said shear and stop are moved relative to each other in accordance with said thickness.

12. In the method of constructing a magnetic core of concentric whole turn laminations of progressively differing lengths including the steps of shearing continuous magnetic strip to form individual laminations and progressively varying the lengths to which successive laminations are sheared, the improvement comprising the steps of measuring the thickness of said continuous strip, and controlling the variation in length to which successive laminations are sheared in accordance with said thickness.

13. In the method of constructing a magnetic core of concentric whole turn laminations of progressively different lengths from a continuous strip of magnetic material including the steps of disposing one end of said strip against a stop, operating a shear while said strip is positioned against said stop to form an individual lamination, and moving said shear and stop relative to each other before the succeeding operation of said shear a distance which is a function of the increment in length of radially successive laminations, the improvement comprising the steps of generating an electrical signal whose magnitude is a function of the deviation of the thickness of said magnetic strip from a predetermined value and whose phase is a function of the direction of said deviation, varying said increment in accordance with the magnitude of said signal and controlling the direction of said variation in accordance with the phase of said signal.

14. In the method of constructing a magnetic core of concentric whole turn laminations of progressively different lengths from a continuous strip of magnetic material including the steps of disposing one end of said strip against a stop, operating a shear while said strip is positioned against said stop to form an individual lamination, and moving said shear and stop relative to each other before the succeeding operation of said shear a distance which is a function of the increment in length of radially successive laminations, the improvement comprising the steps of deriving a first electrical signal whose magnitude is a function of the variation in thickness of said magnetic strip from a predetermined value, comparing said first signal with a reference signal, varying said increment in proportion to the difference in said signals, and controlling the magnitude of said reference signal in accordance with said change in increment, whereby said first signal and said reference signal are balanced when said increment is correct for said material thickness.

References Cited in the file of this patent

UNITED STATES PATENTS

| | | |
|---|---|---|
| 2,194,325 | Rhea | Mar. 19, 1942 |
| 2,306,211 | Geiss | Dec. 22, 1942 |
| 2,890,750 | Depken | June 16, 1959 |